United States Patent
Monahan

[11] Patent Number: 5,925,481
[45] Date of Patent: Jul. 20, 1999

[54] THERMALLY ACTIVATED ELECTRICAL CELL

[75] Inventor: John J. Monahan, Rockford, Ill.

[73] Assignee: Sundstrand Corporation, Rockford, Ill.

[ * ] Notice: This patent is subject to a terminal disclaimer.

[21] Appl. No.: 08/735,157

[22] Filed: Oct. 22, 1996

Related U.S. Application Data

[63] Continuation-in-part of application No. 08/469,349, Jun. 6, 1995.

[51] Int. Cl.$^6$ ....................................................... H01M 6/36

[52] U.S. Cl. ........................................... 429/112; 429/212

[58] Field of Search ...................................... 429/112, 212

[56] References Cited

U.S. PATENT DOCUMENTS

| | | |
|---|---|---|
| 3,625,767 | 12/1971 | Clark et al. . |
| 4,158,084 | 6/1979 | Prentice . |
| 4,634,479 | 1/1987 | Buford . |
| 4,671,211 | 6/1987 | Buford . |

Primary Examiner—John S. Maples
Attorney, Agent, or Firm—Lawrence E. Crowe

[57] ABSTRACT

A thermal battery (10) includes a heat source (16) fabricated from a combination of metallic lithium and a predominantly fluorine substituted hydrocarbon (PFSH) material. In some embodiments the thermal battery (10) includes a combination anode/heat source (62) fabricated from metallic lithium and a polymeric or telomeric PFSH material to provide a lithium based anode with integral heating capability for activating the thermal battery (10). In other embodiments, the anode/heat source (62) is fabricated from other light weight materials having high electromotive potential such as sodium, potassium, calcium, or magnesium, in combination with a predominantly fluorine substituted hydrocarbon.

13 Claims, 4 Drawing Sheets

THERMALLY ACTIVATED ELECTRICAL CELL

This is a continuation of U.S. application Ser. No. 08/469,349, filed Jun. 6, 1995.

TECHNICAL FIELD

This invention relates to thermally activated batteries, and is particularly useful in thermally activated cells having lithium based anodes.

BACKGROUND

Thermally activated batteries are expendable, one-shot, devices. They are typically utilized in equipment such as missiles, torpedoes, or emergency power units to provide a short term source of electrical power for control circuitry or starter motors until an engine driven electrical generator can be brought on line. Equipment of this type must often sit idle for extended periods prior to being activated. These extended periods of inoperation make the use of more conventional batteries impractical, due to the problem of maintaining a proper electrical charge in the battery while the equipment is inoperative.

A typical thermally activated battery includes one or more thermally activated cells, and a heat source. The thermally activated cell includes an anode, and a cathode separated by an electrolyte which is a solid at room temperature. In its solid state, the electrolyte has a very low electrical conductivity. Because of this low electrical conductivity, the cell is essentially inert when the electrolyte is in its solid state. If the temperature is raised above its melting point, the electrolyte becomes ionically conductive, and the cell is capable of delivering electrical energy.

Modern thermal batteries generally use lithium as an anode because it provides superior performance characteristics. Lithium is light weight and has good conductivity. Its standard potential and electromechanical equivalence are higher than all other metals. By virtue of its light weight and superior electrical potentials, electrical cells using lithium as an anode material provide high voltage and high power density. Such cells are also operable over a wide range of temperatures, and feature superior shelf life. In addition to lithium, it will be recognized by those skilled in the art that many other substances may function as an anode/heat source, such as calcium, sodium, potassium, magnesium, and other elements and compounds possessing light weight and high electromotive potential.

In combination with the lithium anode, a modern thermal battery might utilize a cathode of iron sulfide, separated from the anode by an electrolyte of a lithium chloride-potassium chloride material. When heated to about 750° F. (400° C.), the electrolyte becomes molten and ionically conductive.

In prior thermal batteries, pyrotechnic materials such as a zirconium barium chromate heat paper, or a heat pellet containing fine iron powder and potassium perchlorate were often utilized as heat sources. The heat source was generally activated by a percussion-type primer, or an electrical pulse impressed across an electrical match, sometimes known as a "squib" or a "fuse" within the thermal battery.

These prior heat sources are not entirely satisfactory. They have been known to change volume during operation, particularly under the heavy g-loads experienced in some applications. The rate of reaction was sometimes difficult to control, with excessive temperatures (2000° K.) being generated. Such excessive temperature can cause damage to the battery, and reduce the operating time of the battery. The reactions also created a substantial volume of gas in some instances, leading to concerns that high internal gas pressure might rupture a sealed battery case. In some instances the time required after ignition for the heat source to reach the melting point of the electrolyte was too long for effective use of this type of heat source in thermal batteries powering control or fusing circuits in missiles.

In another previously utilized approach, heat sources were provided by fabricating bimetallic structures of metals known to create "exothermic intermetallic reactions (EIR's)". These bimetallic EIR heat sources were formed by laminating together thin foils of the reactant metals by cold-rolling or explosive welding, or by vapor deposition of one metal onto another. Alternatively, mixtures of metal powders compressed into heat pellets were utilized. U.S. Pat. No. 4,158,084 to prentice describes such EIR based heat sources.

EIR based heat sources are not entirely satisfactory. Some of the bimetallic material combinations required to achieve acceptable heat output at a controlled temperature, and reliable initiation of the exothermic reaction, involve metallic materials which are in relatively short supply and are thus generally too costly to be useful as heat sources in practical thermal batteries. In addition, the processes used to produce previously known EIR type heat sources—cold rolling; explosive welding; vapor deposition; mixture of fine powders—are also costly and dangerous, given the pyrophoric nature of the EIR materials.

In summary, prior heat sources in thermal batteries suffered from one or more of the following problems: slow starting; poor control of heat production rate and maximum temperature; potential for rupture due to creation of gases; unacceptably high material and fabrication costs; and danger of light-off during manufacture due to the pyrophoric nature of the materials involved.

It is an object of my invention, therefore, to provide an improved thermal battery, overcoming one or more of the problems described above. Specific objects of my invention include providing:

1. an improved thermally activated cell;
2. an improved heat source for a thermally activated cell;
3. a heat source capable of providing a fast-start reaction, minimal internal pressure rise, and high heat content at predictable temperatures;
4. a thermal battery that may be produced at low cost;
5. a thermal battery which is smaller in size and weight than prior thermal batteries; and
6. a thermal battery offering extended battery operation once activated.

SUMMARY

My invention provides such an improved thermal battery through the use of an improved heat source formed from lithium and a non-metallic compound from the family of materials known as "predominantly fluorine substituted hydrocarbons (PFSH)". These PFSH compounds include materials commonly known by the registered trademark "Teflon".

Specifically, the thermally activated battery of my invention includes one or more thermally activated electrical cells, and a heat source having constituents of lithium and PFSH, with the heat source being disposed in thermal communication with the thermally activated cell(s). Each thermal cell includes an anode, a cathode, and a thermally activated electrolyte disposed between the anode and the cathode.

In a highly preferred embodiment of my invention, the anode is formed from lithium and a PFSH material, combined in such a manner that the anode performs as the heat source for the thermal battery in addition to functioning as the anode of the battery. The need for a separate heat source is eliminated in this embodiment of my invention. A smaller, lighter, less costly battery having fewer constituent parts is thus provided.

According to various aspects of my invention, the PFSH material may be readily applied to the lithium substrate by a variety of low cost methods including: spraying; dipping; vapor-deposition; or mechanically bonding sheets of PFSH to the lithium substrate. The lithium substrate may be configured in a wide variety of shapes including thin foils, shot or granules.

The resultant heat source provides rapid but highly controllable initiation of heat production. Utilization of the predominantly fluorine substituted hydrocarbon, rather than metallic elements as in prior heat sources, allows the coating to be safely applied to the lithium at a low temperature of about 300° F. The need for more costly and potentially dangerous operations required to fabricate the bimetallic compounds of prior heat sources is thus eliminated. The material cost of the PFSH is also generally lower than many of the metallic constituents of prior bimetallic heat sources.

According to another aspect of my invention, the maximum temperature and reaction rate of the heat source of my invention may be readily controlled and pre-selected by adjusting the relative amounts and/or shape of the lithium substrate with respect to the amount and/or shape of the PFSH material. The tendency of prior heat sources to create excessive temperatures, or to react so quickly that operational life was shortened is thus essentially eliminated with the heat source of my invention.

The heat source of my invention produces virtually no gas during the reaction of the lithium and PFSH. Furthermore, according to certain preferred embodiments of my invention, the heat source is fabricated with a small ullage volume to allow for thermal expansion of the heat source constituents as they react. As the lithium melts, the molten lithium flows into the ullage volume in such a manner that the overall volume of the heat source remains virtually the same as before initiation of the reaction. The combination of virtually no gas production and virtually no thermal expansion essentially eliminates concerns with respect to rupture of a battery case due to the excessive internal pressure produced by some prior heat sources.

Other objects, aspects and advantages of my invention will become readily apparent upon consideration of the following drawings and detailed descriptions of preferred embodiments.

DETAILED DESCRIPTION OF PREFERRED EMBODIMENTS

Figure 1:
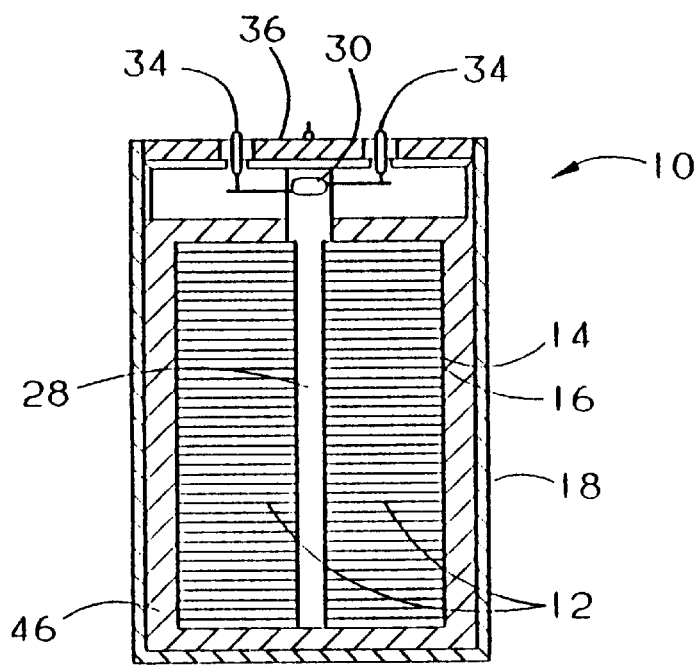
FIG. 1 is a cross-sectional view of a thermal battery according to my invention.

FIG. 1 depicts an exemplary embodiment of a thermal battery 10 according to my invention. The thermal battery 10 includes a stack 12 consisting essentially of one or more thermally activated electrical cells 14, and heat sources 16 mounted within a battery case 18.

Figure 2:
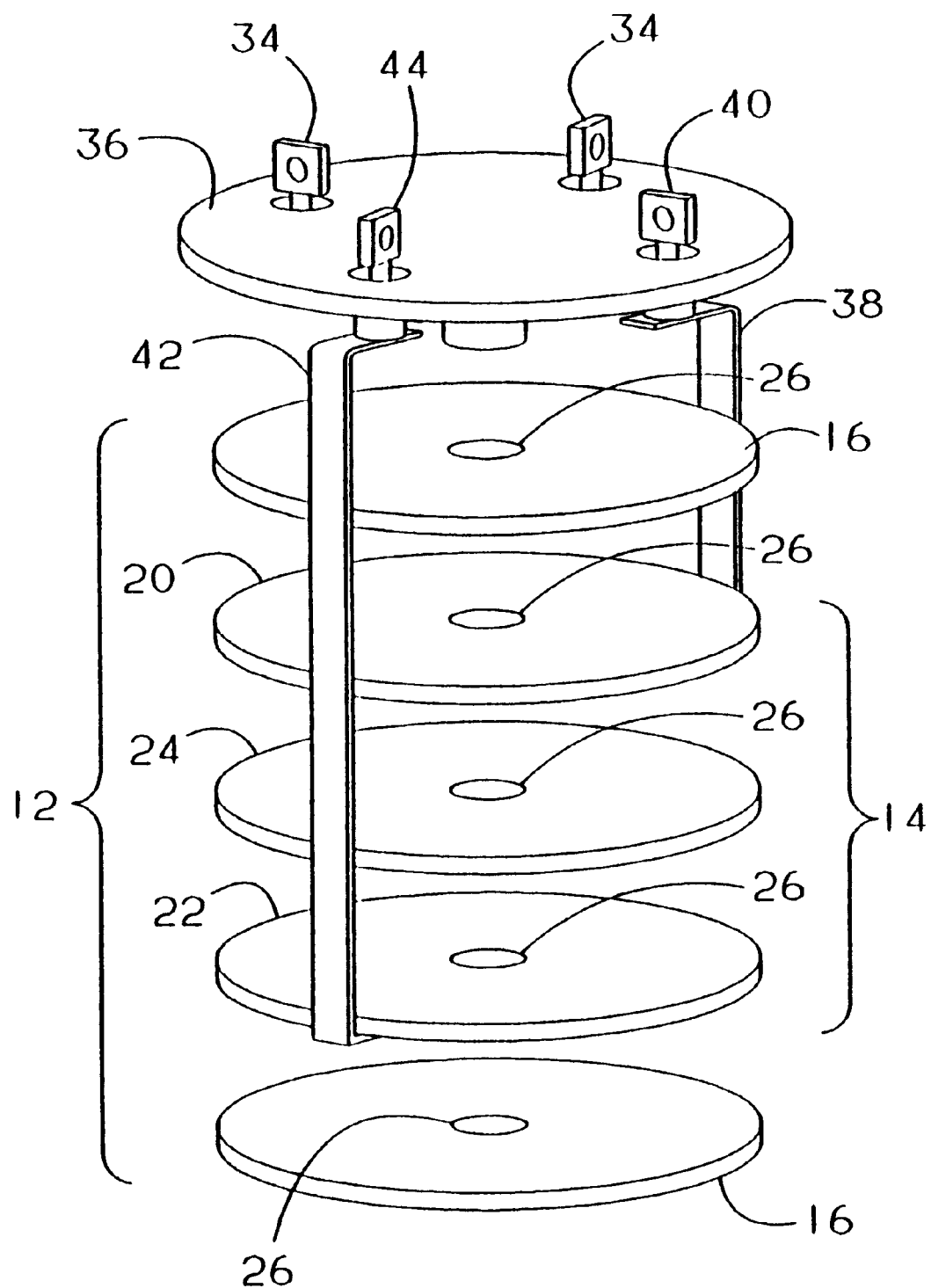
FIG. 2 is an exploded isometric view of selected components of the thermal battery of FIG. 1.

As shown in FIG. 2, each of the thermally activated electrical cells 14 includes an anode 20, a cathode 22, and a thermally activated electrolyte 24 disposed between the anode 20 and the cathode 22. In the embodiments depicted in FIGS. 1 and 2, the anode 20, cathode 22, and electrolyte 24 are all configured as flat annular disks defining a central through-hole 26. When installed in the battery case 18, the electrolyte 24 is tightly sandwiched between the anode 20 and cathode 22.

The heat sources 16 are also flat annular disks having a central through hole 26. When installed in the battery case 18, each electrical cell is tightly sandwiched against or between one or more heat sources 16 to provide intimate contact between the anode 20 and/or the cathode 22 of each electrical cell 14 and at least one heat source 16. The anode 20 and/or cathode 22 thus provides a pathway for thermal communication between the heat source(s) 16 and the thermally activated electrolyte 24 of each of the thermally activated electrical cells 14.

The central holes 26 in the anode 20, cathode 22, electrolyte 26, and heat sources 16 form a fire-hole 28 extending through the stack 12, as shown in FIG. 1. The fire hole 28 in combination with an electrically fired "squib" 30 constitute ignition means for initiating heat production in the heat sources 16. The squib 30 is connected between a pair of ignition terminals 34 which extend through a header 36 that closes one end of the battery case 18. The squib 30 is preferably a conventional incendiary device that will ignite when an electrical signal from an external source is impressed across the ignition terminals 34. The squib 30 is disposed within or adjacent the fire hole 28 such that when the squib 30 is ignited, a flame will propagate through the fire hole 28 and initiate an exothermic reaction in the heat sources 16, which define portions of the fire hole 28. Although an electrically fired squib 30 is illustrated, other types of ignition devices such as percussion caps, or heating elements, etc., could also be used to initiate heat production in a thermal battery constructed according to my invention.

As shown in FIG. 2, positive electrical conductor means in the form of a positive bus bar 38 and a positive terminal 40 are provided to connect the anode(s) 20 to an external electrical load circuit (not shown), such as a start controller for a torpedo, that will utilize the output of the thermal battery 10. Specifically, the positive bus bar 38 electrically connects the anode(s) 20 to the positive terminal 40 which extends through the header 36 to allow connection of the anode(s) 20 to the external circuit (not shown).

Negative electrical conductor means in the form of a negative bus bar 42 and a negative terminal 44 provide a means for connecting the cathode(s) 22 of the thermal battery 10 to the external circuit (not shown), the negative bus bar 42 electrically connects the cathode(s) 22 to the negative terminal 44 which extends through the header 36 to allow connection of the cathode(s) 22 to the external load circuit.

As shown in FIGS. 1 and 2, a layer of insulation 46 is disposed between the battery case 18 and the stack 12 and the bus bars, 38,42 to electrically and thermally isolate the battery case 18 from the internal components of the thermal battery 10.

Operation of the thermal battery 10 is as follows. With an external electrical circuit (not shown) connected across the positive and negative terminals 40,44, no current flows through the circuit until the thermal battery 10 is activated. Shelf lives on the order of several years are thus possible without loss or maintenance of the battery's charge. When operation is desired, an electrical signal is impressed across the ignition terminals 34 causing the squib 30 to fire. A flame from the squib 30 propagates through the stack 12 via the fire-hole 28. The flame passing through the fire hole 28 heats the constituents of the heat sources 16 to a temperature greater than about 350° F. which is sufficient to trigger an exothermic reaction between the constituents of the heat sources 16. Heat generated by the exothermic reaction within the heat sources 16 is conducted through the anodes 20 and/or cathodes 22 to melt the thermally activated electrolyte 24. As the electrolyte 24 melts, a flow of ions begins from the anode 20 through the electrolyte 24 and into the cathode 22. This ionic flow into the cathode 22 allows electrons from the cathode 22 to flow through the negative bus bar and terminal 42, 44 into the external circuit and return to the anode 22 via the positive terminal and bus bar 40, 38, to complete the electrical circuit. The exothermic reaction continues for several minutes, following initiation by firing the squib 30. The layer of insulation 46 retards the flow of heat generated within the battery 10 by the heat sources 16 to provide efficient operation of the battery 10 during the exothermic reaction, and for a period of time after the reaction has ceased. Once the thermal battery 10 has been fired, it is not typically refurbished or reused, but is instead replaced with a new battery 10, and the expended battery is discarded.

The exothermic reaction of the lithium and PFSH constituents in the heat source 16 of my invention produces essentially no gaseous byproducts. The reaction products are essentially solids including lithium-fluoride and lithium-carbon compounds. The problem experienced with some prior heat sources of creating high internal gas pressures leading to the risk of rupturing the battery case is thus eliminated with the heat source 16 of my invention.

My invention may be utilized in thermal batteries 10 having a variety of materials combined to provide the anode 20, cathode 22, and electrolyte 24. One preferred combination applicable to the embodiments described and depicted herein utilizes a lithium anode 20, and a cathode 22 of iron-sulfate, separated by an electrolyte 24 compound including lithium-chloride and potassium-chloride. When this electrolyte 24 is heated to about 750° F. (400° C.) it becomes molten and ionically conductive. Such a lithium-iron cell is capable of producing a high power density electrical potential of about 3.0 V when activated.

The heat source 16 of my invention is comprised of metallic lithium, and a predominantly fluorine substituted hydrocarbon compound (PFSH). In the usual case, the hydrocarbon material will be a polymer (including telomers), although non-polymers can also be utilized if they are sufficiently viscous to remain attached to the lithium for the desired shelf life of the heat source 16. Other materials may be used besides lithium, such as calcium, sodium, potassium, magnesium, and other elements and compounds possessing light weight and high electromotive potential.

By "predominantly fluorine substituted" it is contemplated that as a rule of thumb approximately 70–75% or more of the hydrogen atoms in the basic hydrocarbon will be substituted for by other components, usually fluorine. Typical commercially available materials that may be employed in my invention are those sold under the registered trademark Teflon, including polytethraflouroethylene and polyperflouroalkoxy compounds. A particularly preferred compound is sold under the registered tradename Vydax, and specifically Vydax 550. This material is understood to be a fluorine end capped tetraflouroethylene telomer dispersed in a trichlorotriflouroethane solvent. The preferred materials identified above are commercially available from E. I. DuPont de Nemours Inc., of Wilmington, Del.

In general, I believe that virtually any commercially available polytetraflouroethylene or analogous compound can be utilized without fear of noncompatibility, i.e. reaction with the lithium constituent of the heat source 16 at customary storage temperatures for thermal batteries. The wide range and availability of suitable compounds provides significant cost reduction in comparison to prior heat sources which utilize metallic elements such as platinum which are not widely available at reasonable cost.

The range of commercially available PFSH compounds suitable for use in the heat source 16 of my invention is limited only by the requirement that a coating or a layer of such material must be applied to the lithium at a temperature below the melting point of lithium, i.e. below approximately 357° F., since it is believed that the PFSH constituent of the heat source 16 will begin to react with the lithium when the lithium enters its liquid phase. To provide a safety margin, application of the PFSH coating or layer should thus be carried out at an application temperature less than about 300° F. This requirement for application at about 300° F. or below may limit the range of suitable materials or application methods slightly. Also, materials having solvent-like carriers which might react with lithium at the selected application temperature should not be utilized. In general, however, the wide range of commercially available polymer compounds and the ability to apply such compounds to the lithium at a low temperature provide significant advantages in terms of reduced cost and increased safety in comparison to prior heat sources.

Figure 3:
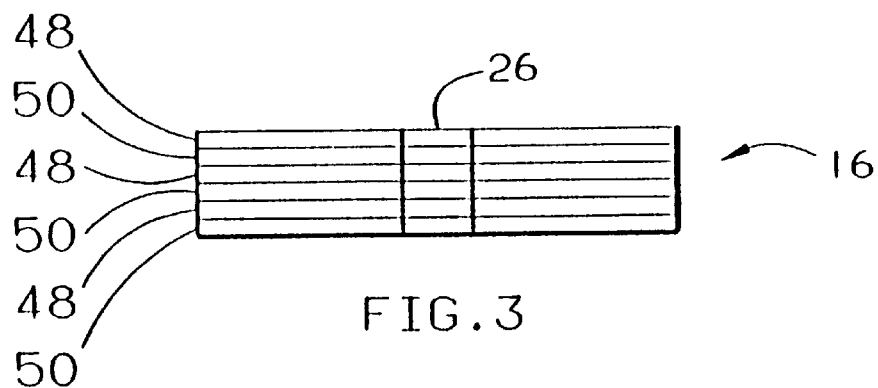
FIGS. 3–7 depict various alternate embodiments of the heat source, and/or the combined anode/heat source of my invention.
Figure 4:
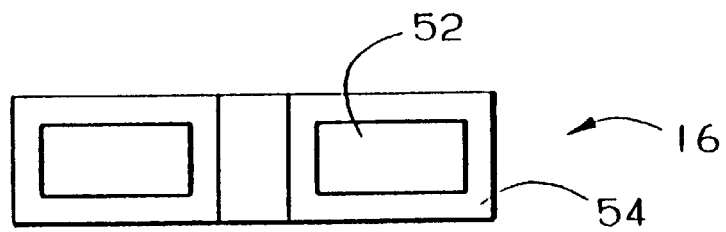
Figure 5:
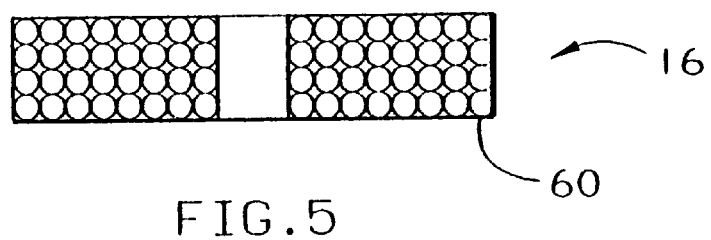
Figure 6:
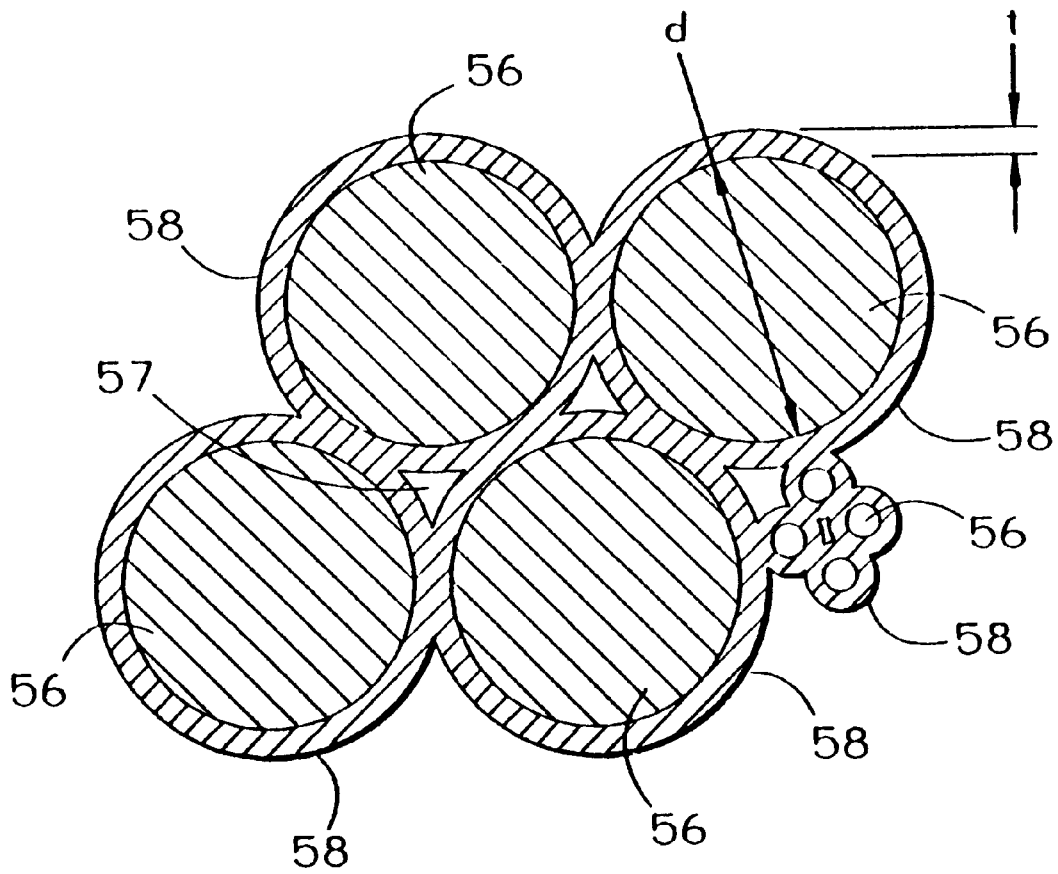

As shown in FIGS. 3–7, the heat source 16 may be conveniently fabricated in a wide variety of configurations by a number of different methods. FIG. 3 shows an embodiment of the heat source 16 having a laminated construction formed from alternating layers of lithium 48 and PFSH 50. Such a laminated heat source may be formed by bonding together sheets of metallic lithium and PFSH at temperatures below 300° F. FIG. 4 shows a heat source 16 having an inner substrate disk of lithium 52 coated with a layer of PFSH 54. FIGS. 5 and 6 show a preferred embodiment of the heat source 16 having lithium shot or granules 56 encapsulated with a coating of PFSH 58. As used interchangeably herein, the terms "shot" or "granule" refer to any spherical, non-spherical, regularly or irregularly shaped practice of lithium having a small nominal cross-section, i.e. about 1–25 mm preferably.

The heat source configurations depicted in FIGS. 4–6 may be formed by applying the PFSH coating to the lithium substrate by a number of methods including spraying, dipping, tumbling, or vapor deposition. Specifically, commonly assigned U.S. Pat. Nos. 4,634,479 and 4,671,211, which are incorporated herein by reference, teach preferred methods for applying a coating of PFSH to a lithium substrate by vapor deposition. In any of the heat sources 16 depicted in FIGS. 3–6, thermal characteristics of the heat source 16—such as initiation rate, heat production rate, maximum operating temperature—can be pre-selected and readily controlled by judicious design of the shape of the heat source 16 constituents, and by controlling the reactive mass ratio of the lithium and PFSH. Because the PFSH material may be applied at low temperature by simple processes such as spraying or vapor deposition, it is relatively easy and inexpensive to build up a desired coating thickness by repetitive coating cycles. Precise control of coating thickness is thus achievable with little risk of initiating a premature exothermic reaction during manufacture of the heat source.

FIGS. 5 and 6 specifically depict a highly preferred embodiment of a heat source 16 in which the PFSH coating 58 is applied to the lithium shot or granules 56 in a manner resulting in the shot being effectively bonded together by the coating 58, as indicated at 60, such that the resulting heat source 16 be an integral assembly of the shot 56 and the PFSH coating 58 to facilitate assembly of the heat source 16 into the stack 12 of the thermal battery 10.

Although those skilled in the art will recognize that this bonding can be accomplished with a variety of fabrication methods, a method similar to the method taught in Buford '211 can yield good results. Buford '211 teaches in situ application of a PFSH coating to lithium pellets after the lithium pellets are installed in a boiler, using a vapor deposition process.

Adapting the process of Buford '211 to form the integrally bonded heat source of FIG. 5 of my invention, the lithium shot 56 is introduced into a closed mold which, defines the shape of the heat source 16. The mold includes an inlet through which a gas may be introduced. A PFSH material dissolved in a solvent is then introduced into the mold, via the inlet, to fill all of the interstices 57 between the lithium shot 56. Preferably a 5% solution of Vydax 550 in freon is employed, with the freon acting as a solvent. The freon is then evaporated under a vacuum, of about 10 inches mercury absolute for example, leaving a coating of PFSH 58 on the lithium shot 56. The steps of introducing the PFSH and solvent into the mold, and then evacuating the solvent can be repeated until a desired thickness of the PFSH is built up on the lithium shot 56, or until a desired stoichiometric ratio of mass of PFSH to mass of lithium within the mold is achieved.

By judicious selection of a nominal cross-section d of the lithium shot 56 and a thickness t of the PFSH coating 58, the maximum temperature and heat production rate of the heat source 16 can be readily predetermined.

A desired ullage volume consisting of the sum of the interstices 57 between the lithium shot 56 remaining after application of the PFSH coating 58 can also readily be provided. By providing an ullage volume (total void space formed by the interstices 57) of about 20%, the volume of the heat source 16 will remain essentially constant during the exothermic reaction of the lithium shot 56 and the PFSH coating 58. The ullage volume allows room within the volume initially defined by the heat source 16 to compensate for the increase in size of the heat source constituents as they expand and melt following initiation of the exothermic reaction. As shown in FIG. 6, it may also be desirable to utilize lithium shot 56 of two or more different nominal cross-sections d to achieve a desired ullage volume, or a desired high surface area to volume ratio conducive to rapid propagation of the exothermic reaction within the heat source 16 after initiation of the reaction by firing the squib 30. For lithium shot 56 having nominal cross-sections d in the range of about 1 to 25 millimeters, the desired 19–20% ullage volume can generally be readily attained by utilizing a mixture of large and small lithium shot 56, with the large shot 56 having a nominal cross-section d of about 20 times the cross-section d of the small shot 56.

Those skilled in the art will recognize that the integrally bonded heat source 16 described above can also be produced in situ within the battery case 18 in a manner similar to that taught in Buford –211. For instance, in the embodiment of FIG. 1, the stack 12 can be assembled inside the battery case 18 with layers of lithium shot 16 provided at sites where it is desired to have a heat source 16. The mixture of PFSH and solvent can then be introduced into the stack 12 via an inlet (not shown) extending through the battery case 18, and via the fire hole 28 to coat the lithium shot 56 in situ.

Figure 7:
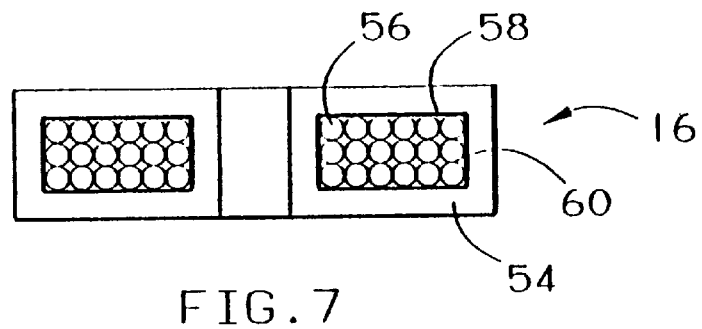

FIG. 7 illustrates another alternate embodiment of the heat source 16 in which a core of lithium shot 56 coated with PFSH 58 is encapsulated in a shell 54 of PFSH or other material. Such a construction allows lithium shot 56 individually coated with a layer 58 of PFSH, by a process such as tumbling or spraying to be formed into a one piece structure in order to facilitate fabrication of the stack 12. The shell 54 thus provides a "container" for the PFSH coated lithium shot. The shell can be pre-formed with an opening to introduce the PFSH coated shot. Non-coated lithium shot 56 can also be utilized within a PFSH shell 54.

Because the shell 54 provides environmental sealing, as well as an alternative means for predetermining a stoichiometric volume or area ratio of the reactants, the shell 54 may also be advantageously employed in some applications which utilize a bonded heat source 16 as described above with respect to FIGS. 5–6. The shell 54 can be applied to the bonded core 60 as shown in FIGS. 5 and 7 by a number of processes including spraying, dipping, or tumbling.

In the various heat source embodiments described above it is preferred that the lithium constituent constitute about 60–86 percent by weight, and that the PFSH or telomer constituent constitute about 40–14 percent by weight. For heat source embodiments in which the PFSH is applied as a coating on a lithium substrate, a nominal coating thickness of about 0.060 inches or less is preferred. Where the lithium substrate is in the form of a lithium shot, a nominal spherical shot diameter in the range of about 1–25 mm is preferred.

Figure 8:
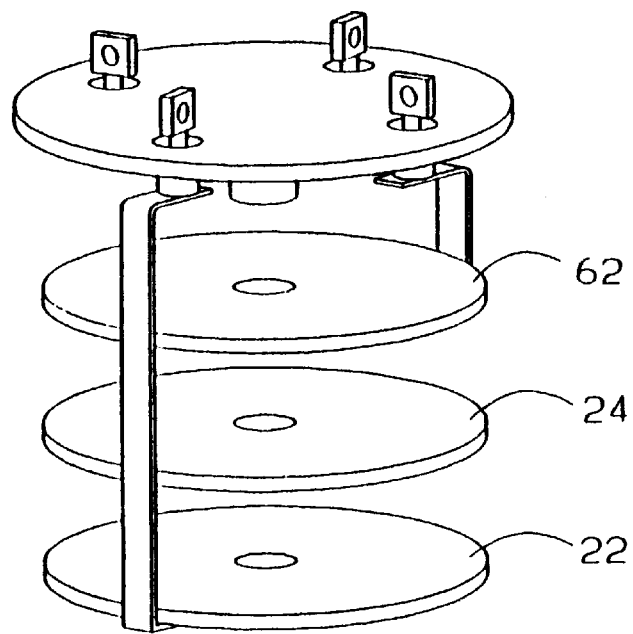
FIG. 8 is an exploded isometric view of an alternative embodiment of the components depicted in FIG. 2, wherein the heat source is incorporated, integrally into the anode of the thermal battery.

FIG. 8 depicts a highly preferred embodiment of a thermal battery according to my invention, in which a combined anode/heat source 62 includes both lithium and PFSH, and functions as both the anode and the heat source for the thermal battery. The separate heat sources 16, as depicted in FIG. 2 are thus eliminated, resulting in a battery which is smaller in physical size, and having fewer constituent parts, thereby reducing the cost of producing the battery 10. The combined anode/heat source 62 may be conveniently produced in a wide variety of configurations by a wide variety of methods, including those described above with relation to the heat sources 16 of FIGS. 1 through 7.

From the foregoing description, those skilled in the art will readily recognize that the thermal battery of my invention provides significant improvements over prior thermal batteries. By utilizing lithium in combination with PFSH materials to produce heat sources 16, or combined anodes/heat sources 62, my invention allows production of a thermal battery which is smaller, weighs less, performs better, and costs less to produce than prior thermal batteries.

Those skilled in the art will further recognize that although I have described my invention herein with respect to a number of specific embodiments therefor, many other embodiments and applications of our invention are possible within the scope of my invention as described in the appended claims. For example, material combinations other than those referenced herein may be utilized for the anode 20, cathode 22 and electrolyte 29 of the thermal battery 10 of my invention. Aside from lithium, materials such as calcium, sodium, potassium, magnesium, and other elements and compounds possessing light weight and high electromotive potential can be used. It may also be desirable to include other structural elements such as a non-reactive container, or layers of a woven glass or ceramic fabric in the heat source 16 or combined anode/heat source 62 to facilitate manufacture, or to provide structural support for the molten lithium and PFSH materials during the exothermic reaction. Lithium powders or shot 56 of diameters other than those specified with regard to the exemplary embodiments described herein may prove to be more advantageous in other embodiments of the invention. Similarly, other numerical values for ullage volumes, size ratios etc. as stated herein are given for purposes of illustration with respect to the embodiments provided herein. Other numerical values more appropriate to alternate embodiments of my invention also fall within the scope of my invention. It is understood, therefore, that the spirit and scope of the appended claims should not be limited to the specific embodiments described and depicted herein.

I claim:

1. A thermally activated battery having a cathode, a thermally activated electrolyte, and a combined anode/heat source for activating said thermally activated electrolyte of said thermally activated battery.

2. The thermally activated battery of claim 1 wherein said combined anode/heat source is formed from one metal from the group consisting of lithium, sodium, potassium, calcium, and magnesium, in combination with a predominantly fluorine substituted hydrocarbon.

3. The thermally activated battery of claim 2 wherein said predominantly fluorine substituted hydrocarbon material is a polymeric or telomeric material selected from the group consisting of polyperfluoroalkoxy, polytetrafluoroethylene, tetrafluoroethylene telomers, and mixtures thereof.

4. The thermally activated battery of claim 2 wherein said anode/heat source is formed from alternating layers of the said metal and the predominantly fluorine substituted compound.

5. The thermally activated battery of claim 2 where said one metal is formed from metallic shot and said predominantly fluorine substituted hydrocarbon is deposited on said metallic shot in the form of a coating.

6. The thermally activated battery of claim 2 wherein the one metal constitutes 60 to 90 weight percent of the combined anode/heat source, and the telomer constitutes 40 to 10 weight percent of the combined anode/heat source.

7. The thermally activated battery of claim 2 wherein said predominantly fluorine substituted hydrocarbon telomer is provided in the form of a coating having a nominal thickness of about 0.060 inches or less applied to a metallic substrate.

8. The thermally activated battery of claim 2 wherein said metallic substrate is provided in the form of metallic shot having a nominal spherical diameter in the approximate range of 1–25 millimeters.

9. In a thermally activated battery having a cathode, a thermally activated electrolyte, and a combined anode/heat source for activating said thermally activated electrolyte of said thermally activated battery, wherein said combined anode/heat source includes constituents of metal selected from the group consisting of lithium, sodium, magnesium, calcium, and potassium, and a predominantly fluorine substituted hydrocarbon material, a method for producing an electric current in an electrical circuit connected between said anode/heat source and said cathode, said method comprising the steps of:

(a) initiating an exothermic chemical reaction between said metal and predominantly fluorine substituted hydrocarbon constituents of said anode/heat source; and (b) activating said electrolyte by said exothermic chemical reaction to permit electric current flow between said anode/heat source and said cathode.

10. A thermally activated battery, comprising:

(a) one or more thermal cells each including:
 (1) an anode/heat source comprised of a metal selected from the group consisting of lithium, sodium, magnesium, potassium, and calcium, and a fluorine substituted hydrocarbon;
 (2) a cathode; and
 (3) a thermally activated electrolyte disposed between said anode/heat source and cathode;

(b) a battery case surrounding said one or more thermal cells;

(c) ignition means for igniting said anode/heat source(s);

(d) positive electrical conductor means extending from said one or more anode/heat source(s) through said battery case for attachment of said anode/heat source to an external electrical circuit; and (e) negative electrical conductor means extending from said one or more cathodes through said battery case for attachment of said cathode(s) to an external electrical circuit.

11. The thermally activated battery of claim 10 wherein said one or more anode/heat source(s), cathode(s), and electrolyte(s) are all configured as flat plates and said thermally activated battery includes a laminated stack of said anode/heat source(s), cathodes(s), and electrolyte(s).

12. The thermally activated battery of claim 10 wherein said ignition means includes a fire hole defined by and extending through said laminated stack and an electric match having electrical ignition terminals extending through said battery case for attachment of said electric match to a source of electrical energy, said match being disposed within said fire hole for igniting said anode/heat source(s) when an electrical signal is impressed across said ignition terminals.

13. The thermally activated battery of claim 10 wherein the anode/heat source is lithium and a predominantly fluorine substituted hydrocarbon.

* * * * *